United States Patent [19]

Gage

[11] 3,858,296
[45] Jan. 7, 1975

[54] COIL PROCESSING APPARATUS

[75] Inventor: John C. Gage, Mt. Sterling, Ky.

[73] Assignee: A. O. Smith Corporation, Milwaukee, Wis.

[22] Filed: Jan. 24, 1974

[21] Appl. No.: 436,041

[52] U.S. Cl. ............................................. 29/205 D
[51] Int. Cl. .......................................... H02k 15/06
[58] Field of Search .......... 29/205 D, 205 R, 205 C, 29/596

[56] References Cited
UNITED STATES PATENTS

| | | | |
|---|---|---|---|
| 3,525,147 | 8/1970 | Kieffer | 29/596 |
| 3,602,972 | 9/1971 | Droll | 29/205 R |
| 3,672,026 | 6/1972 | Cutler | 29/205 R |
| 3,689,976 | 9/1972 | Donovan | 29/205 D |

Primary Examiner—Thomas H. Eager
Attorney, Agent, or Firm—Andrus, Sceales, Starke & Sawall

[57] ABSTRACT

A coil transferring tool provides a plurality of circumferentially spaced rods with a plurality of openings therebetween for receiving and retaining coils of electric wire from a coil forming machine to be transferred to a coil inserting apparatus for placement within a dynamoelectric machine stator. Certain rods are stationary with respect to a supporting member for receiving certain coils while other rods are movable to various extended positions for receiving additional axially spaced coils of different size from the coil forming apparatus. End members are provided for each rod which mate with and mask a plurality of wedge inserting openings in the inserting apparatus to protect the coils of wire as they are being transferred and further to align the coil retaining openings of the coil transferring tool with the coil receiving openings in the coil inserting apparatus.

23 Claims, 9 Drawing Figures

Patented Jan. 7, 1975
3,858,296
2 Sheets-Sheet 1
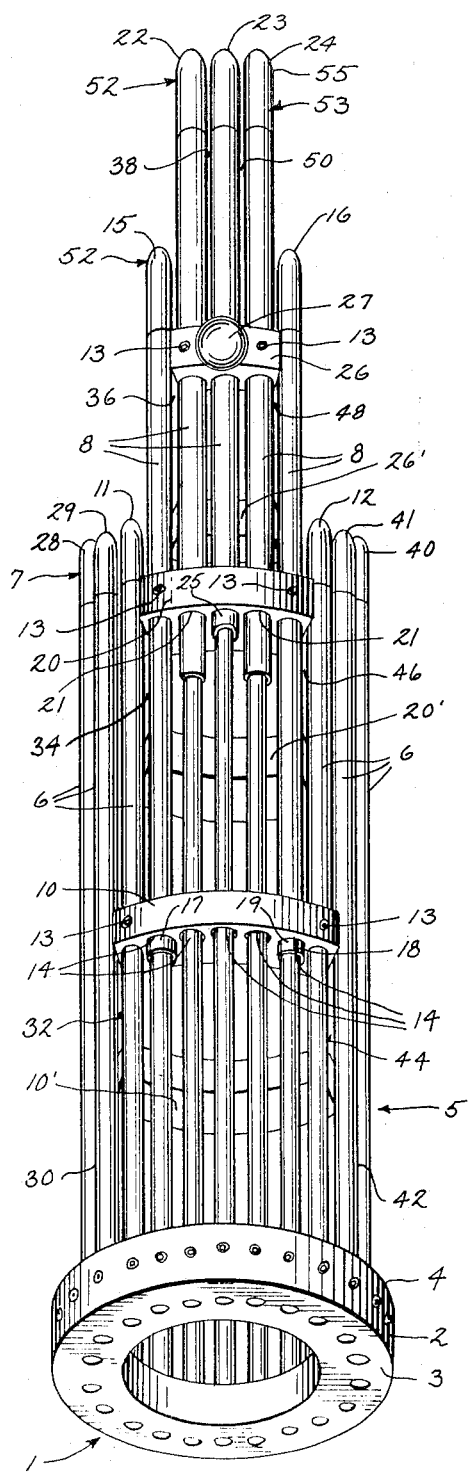
Fig.1
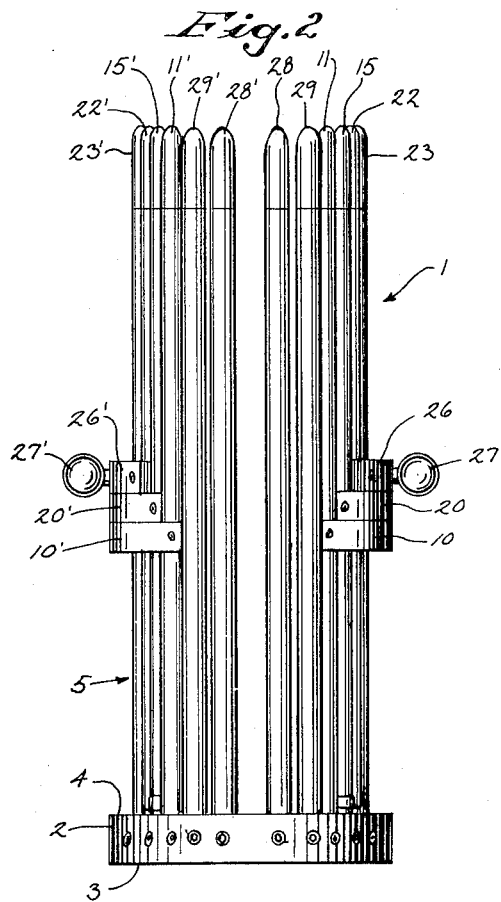
Fig.2
Fig.4

Patented Jan. 7, 1975  3,858,296

COIL PROCESSING APPARATUS

BACKGROUND OF THE INVENTION

This invention relates to an apparatus for processing coils of wire to be used in a dynamoelectric machine and particularly includes the use of a highly desirable coil transferring tool.

Coil winding or forming machines have been utilized to form pre-wound coils which are thereafter transferred to a coil inserting apparatus for subsequent placement within selected slots of a stator core assembly for use in a dynamoelectric machine.

Various methods have been utilized for winding stator coils on collapsible coil molds including the method where the coil mold provides a number of axially disposed stepped portions upon which a group of coils of different size are continuously wound. One method provides relative movement between the coil mold and a rotating winding flyer at a predetermined speed so that each successive turn is axially disposed adjacent to the preceding turn thereby providing each coil with only a single layer of turns.

Coils having only a single layer of turns may be used in a coil inserting apparatus such as shown in the U.S. Pat. No. 3,689,976 issued on Sept. 12, 1972 and assigned to a common assignee herewith which desirably transfers each turn of the single layer coil in sequential order into an appropriate stator slot through the operation of a stripper. It is therefore highly desirable to transfer each single layer coil from the coil forming mold to the coil inserting apparatus by the use of a transfer tool which does not disturb the single layer configuration or form. It is further highly desirable to transfer a large number of such single layer coils at one time to provide an economical and time efficient method of fabricating electric motors.

Some prior coil transferring tools have utilized a plurality of circumferentially spaced bars or rods which are fixedly mounted to a supporting base for providing a plurality of circumferentially orientated openings between the adjacent bars for receiving a plurality of single layer coils from the coil forming apparatus. Such a transfer tool is frequently limited to receiving a small number of axially spaced single layer coils unless the fixedly mounted rods extend to a great length which results in the transfer tool becoming difficult and cumbersome to handle.

Some coil forming devices have been constructed so as not to require a portable coil transferring tool but rather employ a plurality of circumferentially spaced transfer bars which are fixedly connected to a supporting base for uniform axial movement within openings in the coil forming mold. Such mold mounted transfer bars are generally uniformly axially extended to protrude from the coil forming mold at the termination of the winding step so that the formed coils may be directly transferred to the coil inserting apparatus. While such a coil forming apparatus eliminates the need for a coil transfer tool, it further necessitates the placement of the coil forming apparatus in close proximity to the coil inserting apparatus and further requires accurate alignment of the transfer bars of the coil forming device with respect to the openings within the coil inserting apparatus.

A problem frequently encountered with the use of many coil transferring tools arises when the coils of wire become damaged in being transferred to the openings within the coil inserting apparatus. Such damage commonly occurs when the coils snag or rub against the edges adjacent to the openings provided in the fingers of the coil inserting apparatus which permit the passage of slot insulating wedges. Such abrasion or snagging has been found to tear or remove the wire insulation, thereby rendering the coil inoperative for use in an electric motor.

SUMMARY OF THE INVENTION

This invention relates to an apparatus for processing coils of wire to be used in a dynamoelectric machine and particularly includes a coil transferring tool which is compact and economically operable for receiving and retaining a plurality of coils of wire.

One aspect of the invention provides a coil transferring means for removing a plurality of spaced coils of wire from a coil holding means and provides a plurality of coil retaining means, at least one of which is movably mounted with respect to a supporting member of the coil transferring means for receiving one of the coils from the coil holding means.

The plurality of coil retaining means provided by the coil transferring means may be utilized in various manners to provide a highly versatile coil transfer tool. Thus in one aspect of the invention, one coil retaining means is fixedly connected to the supporting member for receiving and retaining one coil from the coil holding means while a second coil retaining means is movably connected to the supporting member for movement between a retracted position and an extended position for receiving and retaining another coil from the coil holding means. In another aspect of the invention, one coil retaining means is movably connected to the supporting member for movement between a retracted position and a first extended position for receiving and retaining one coil from the coil holding means while a second coil retaining means is movably connected to the supporting member for movement between a retracted position and a second extended position which is greater than the first extended position for receiving and retaining a second coil from the coil holding means.

Applicant's invention thus provides a highly desirable coil transferring tool which can be utilized for removing and holding a large number of axially spaced coils of wire from a coil forming device while further having the advantage of being a compact tool for convenient handling. The coil transferring means preferably utilizes a plurality of spaced members providing a plurality of spaced openings therebetween for supporting the plurality of coils and provides an extension means for permitting a selected member to be movable longitudinally between the retracted and extended positions to be disposed within one of the selected axially spaced coils of wire on the coil holding means for easy and convenient removal to the coil transferring means.

Each coil retaining means utilizes a pair of spaced elongated members which provide an opening therebetween for removably retaining a coil of wire. Although applicant's invention is not so limited, the spacing between adjacent elongated members can be preselected to ensure that the single layer of turns received from the coil holding means remains in its assembled form thereby preventing tangling and intermixing of turns while the coil is being transferred from the coil holding means to the coil inserting apparatus. In a preferred form of the invention, certain adjacent coil retaining means may share a common elongated member thereby enabling the transfer tool to be constructed in a compact form.

The present invention may further be advantageously utilized for removing coils of wire from the coil holding apparatus which vary in size. In such an operation, an extended coil retaining means is moved to a retracted position with a coil of wire received from the coil holding means so that at least two of the coils retained by the coil transferring means are disposed in a nested relationship with respect to each other. Such nesting of two or more coils of wire enables the transfer tool to be transported in a compact position for easy and efficient handling without fear of tangling the turns of wire.

One or more guide members are connected to certain spaced members and provide means for guiding one or more of the selected members during longitudinal movement. In the preferred form of the invention, an additional guide member is provided for each additional extended position to be provided by the selectively movable members.

One or more stop means are provided, each of which cooperates with a guide member and a selectively movable member to define the retracted and extended positions for the selectively movable members. In a preferred form of the invention, the selectively movable member constitutes a tube which telescopes over a rod-shaped member fixedly connected to the supporting member and is further movably positioned within an opening in the guide member. A ring is fixedly connected to the movable tube for selective engagement with the guide member for defining the extended position by preventing further movement of the tube. A plurality of guide members may also be positioned to selectively engage each other to prevent further movement of a selectively movable member while additional stop projections may be connected to movable members for selective contact with the guide members to define other extended and retracted positions.

The preferred usage of the invention utilizes three permanently positioned spaced members and three selectively movable members to provide five openings for receiving five corresponding axially spaced coils. The six members are preferably connected to a circular base member and circumferentially spaced substantially within a quadrant thereon. The preferred transfer tool further employs six identically constructed members substantially within an adjacent quadrant of the base member which similarly provides five openings for receiving the five axially spaced coils. The movable members in both quadrants may be simultaneously operated so that each received coil is retained within two openings provided by the two quadrants. The fixed and movable members in the first and second quadrants are duplicated in the third and fourth quadrants of the support member except that one movable member is shared by both the first and the fourth quadrants and another movable member is shared by both the second and third quadrants. The ten openings provided by the third and fourth quadrants may be utilized to selectively receive an additional five coils in a manner as described above so that the preferred form of the transfer tool may receive and retain up to ten coils each having a single layer of turns.

Applicant's novel transfer tool further provides masking means associated with certain of the spaced members which selectively cooperate to mask certain openings within a coil inserting apparatus which are formed to permit the passage of an insulating member. In a preferred form of the invention, the outer portion of each spaced member is designed to engage an insulating member opening for providing an accurate alignment between the coil carrying openings of the transfer tool and the coil receiving openings of the coil inserting apparatus while further masking the insulating member openings to prevent damage to the coils. The plurality of circumferentially spaced members of the transfer tool are preferably designed to surround a plurality of circumferentially spaced blade members provided by the coil inserting tool while the insulating member openings are being masked.

Applicant has therefore provided a highly desirable apparatus for processing coils of wire which includes a unique transfer tool which is capable of being transported in a compact form and extends to receive a large number of single layer coils from a coil forming apparatus.

BRIEF DESCRIPTION OF THE DRAWINGS

The drawings furnished herewith illustrate the best mode presently contemplated by the inventor and clearly disclose the above advantages and features, as well as others which will be readily understood from the detailed description thereof.

In the drawings:

FIG. 1 is a perspective view of a coil transferring tool showing certain coil retaining rods in an extended position;

FIG. 2 is a side elevational view of the transferring tool of FIG. 1 showing all coil retaining rods in a retracted position;

FIG. 4 is a perspective view showing the placement of the coil transferring tool of FIG. 1 with a coil forming apparatus;

DESCRIPTION OF THE PREFERRED ILLUSTRATED EMBODIMENT

Figure 3:
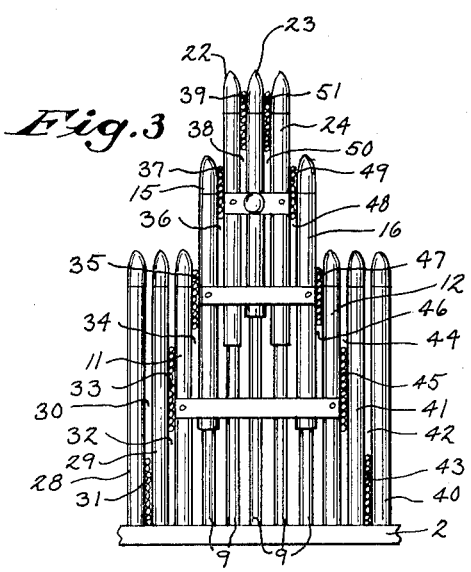
FIG. 3 is a developed view showing several of the coil retaining rods in FIG. 1 in a planar illustration.

Referring to the drawings and particularly to FIGS. 1 through 3, the illustrated embodiment of the invention includes a coil transfer tool 1 providing a circular base 2 having an outer face 3 and an oppositely disposed supporting face 4 upon which are mounted a plurality of circumferentially spaced rods or bars 5.

The rods 5 include a plurality of fixedly connected rods 6 which are rigidly secured to surface 4 and extend outwardly to each provide an outer end portion 7 which is maintained at a predetermined distance from the surface 4. In addition, the rods 5 further include a plurality of telescoping tubes 8 each of which is longitudinally movable over an inner rod 9 fixedly connected to the surface 4 of base member 2.

A guide member 10 is fixedly connected to a pair of spaced rods 11 and 12 of the fixedly connected rods 6 by the use of rivets 13 or other appropriate fastening devices. The guide element 10 is constructed from a portion of an angular ring and provides a plurality of spaced openings 14 for enclosing and retaining the rods 9. The openings 14 are circularly shaped with a diameter of sufficient size to further movably retain the tubes 8 therein. Specifically, a pair of spaced tubes 15 and 16 are mounted adjacent to the rods 11 and 12, respectively, and remain movably positioned in telescoping engagement with the rods 9 within the corresponding openings 14 provided by the guide element 10. A pair of annular rings 17 and 18 are fixedly connected such as by welding or the like to a lower portion of tubes 15 and 16, respectively, and provide an outer circumferential surface 19 having a magnitude which will not pass through the openings 14 within the support member 10.

A guide member 20 is fixedly connected to the spaced movable tubes 15 and 16 such as by rivets 13 or other satisfactory fastening devices and further contains a plurality of openings 21 for receiving and guiding the movable tubes 22, 23 and 24. An angular ring 25 is fixedly connected to a lower portion of tube 23 and provides an outer circumferential surface having a magnitude which will not pass through the corresponding opening 21. The ring 25 is smaller than the rings 17 and 18 and is permitted to pass through the corresponding opening 14 provided in the guide member 10.

An outer stop member 26 is fixedly connected to the rods 22, 23 and 24 such as by rivets 13 or other suitable fastening devices and further provides an outer hand grip or nob 27.

The tubes 15 and 16 are thus longitudinally movable over the corresponding rods 9 and may be selectively moved inward toward the base member 2 to a retracted position, as illustrated in FIG. 2, which occurs when the guide member 20 engages the guide member 10 thereby preventing further movement of tubes 15 and 16 toward the base member 2. The tubes 15 and 16 may be selectively moved outwardly away from the base member 2 to a fully extended position, as illustrated in FIG. 1, which occurs when the rings 17 and 18 retained by the tubes 15 and 16, respectively, engage the guide member 10 thereby preventing further outward movement.

In a similar manner, the tubes 22, 23 and 24 may be selectively moved longitudinally by telescoping over the inner corresponding rods 9 to a retracted or compact position, as illustrated in FIG. 2, which occurs when the stop member 26 engages the guide member 20 thereby preventing further movement toward the supporting base member 2 of the tubes 22, 23 and 24 with respect to the tubes 15 and 16. The tubes 22, 23 and 24 may also be selectively moved outwardly away from the base member 2 to an extended position, as illustrated in FIG. 1, which occurs when the stop ring 25 connected to the tube 23 engages the guide member 20 thereby preventing further outward movement of the tubes 22, 23 and 24 away from the supporting base member 2. It is noted that the ring 25 is permitted to pass through the corresponding opening 14 in the guide member 10 as the tube 23 is telescoping.

The retracted positions of the movable tubes 8 could also be defined by the engagement of the lower portion of one or more tubes with the supporting surface 4 in an alternative construction.

The fixedly connected rods 6 further include the rods 28 and 29 which are spaced to provide a coil receiving slot 30 for holding a coil 31 as illustrated in FIG. 3 while the rod 29 is spaced from the rod 11 to provide another coil receiving slot 32 for holding a coil 33. In addition, the permanently fixed rod 11 is spaced from the movable tube 15 by a coil receiving slot 34 for holding a third coil 35. The movable tube 15, in turn, is spaced from the movable tube 22 to provide a coil receiving slot 36 for holding a fourth coil 37 while the movable tube 23 is spaced from the tube 22 to provide a coil receiving slot 38 for holding fifth coil 39.

The fixedly connected rods 6 also include the rods 40 and 41 which are spaced to provide a coil receiving slot 42 therebetween for receiving a sixth coil 43. The rod 41, in turn, is spaced from the fixed rod 12 to provide a coil receiving slot 44 for receiving a seventh coil 45. The fixed rod 12, in turn, is spaced from the movable tube 16 to provide a coil receiving slot 46 for receiving an eighth coil 47. The movable tube 16 is spaced from the movable tube 24 to provide a coil receiving slot 48 for receiving a ninth coil 49 while the movable tube 24 is spaced from the movable tube 23 to provide a coil receiving slot 50 for receiving a tenth coil 51.

The fixed rods 11, 28 and 29 together with the movable tubes 15, 22, and 23 are thus spaced to provide the slots 30, 32, 34, 36 and 38 for receiving and retaining the five coils 31, 33, 35, 37 and 39, respectively. Similarly, the fixed rods 12, 40 and 41 together with the movable tubes 16, 23 and 24 are spaced to provide the slots 42, 44, 46, 48 and 50 for receiving and retaining the five coils 43, 45, 47, 49 and 51, respectively.

The fixed rods 11, 12, 28, 29, 40 and 41 together with the movable tubes 15, 16, 22, 23 and 24 together with the other associated members above described are located on only one-half of the circular supporting base member 2. The other one-half of the base member 2 also contains a number of fixed rods and movable tubes which are constructed in an identical configuration as above described and operate in the same manner. As the construction on the opposite one-half of the base member 2 is identical with the members described above, the mirrored elements on the opposite one-half of the base member 2 will be designated with identical numbers primed and further description thereof is deemed unnecessary.

The outer end portions 7 of the fixed rods 6 and the outer end portions 52 of the movable tubes 8 each contain an end cap 53 which has a lower tube-shaped portion 54 for securely fitting over the ends 7 and 52 and further provides an outer tip portion 55 which is specially shaped to mate with certain openings within a coil inserting apparatus as more fully described hereinafter. The end caps 53 are preferably made very thin from a plastic type material to facilitate the handling of coils to prevent the accidental removal of insulation when transferring the coils to and from the coil transferring tool 1.

Figure 5:
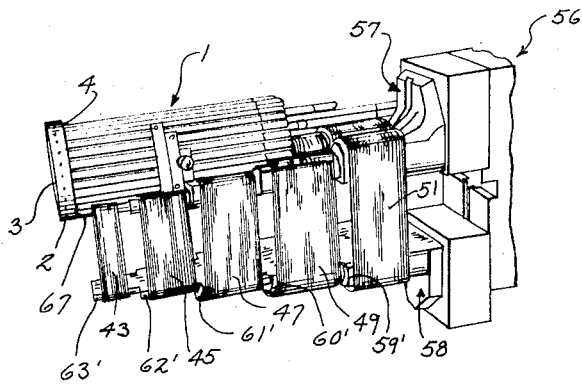
FIG. 5 is a perspective view showing the transferring tool and the coil forming apparatus of FIG. 4 and illustrating the handling of a plurality of five axially spaced coils.
Figure 6:
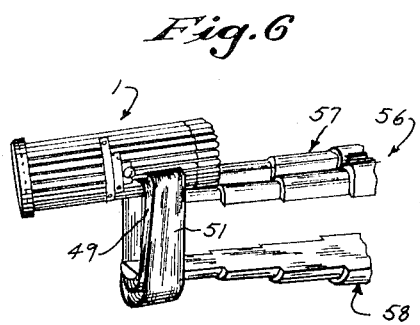
FIG. 6 is a perspective view showing the coil transferring tool and the coil forming apparatus of FIG. 4 and illustrating the removal of a plurality of two axially spaced coils from the coil forming apparatus.

The coil transfer tool 1 is advantageously utilized with a coil forming apparatus 56 as illustrated in FIGS. 4-6. The coil forming apparatus 56 in the preferred embodiment employs a collapsible mold having an upper portion 57 and a lower portion 58 which are selectively moved with respect to each other for decreasing the tension upon the coils wound thereon to facilitate the removal of coils. The upper portion 57 contains five axially disposed stepped portions 59, 60, 61, 62, and 63 while the lower portion 58 contains similar axially disposed stepped portions which are spaced to correlate with the stepped portions of the upper form 57 and therefore are identified by identical numbers primed. The upper portion 57 also provides a central opening 64 which dissects the upper form portion 57 into two forked projections 65 and 66, each containing the stepped portions 59, 60, 61, 62, and 63. The separation 64 between the projections 65 and 66 is of a predetermined distance to permit the entry of at least a portion of the transfer tool 1 therein for permitting removal of the coils formed on the apparatus 56.

In operation of the coil forming apparatus 56, a rotating flyer (not shown) forms up to five coils of wire upon the five stepped portions 59-63. When operating in a preferred manner, the coils are formed so that each successive turn is axially disposed adjacent to the preceding turn thereby forming each coil with only a single layer of turns along the corresponding stepped portion.

The five coils 43, 45, 47, 49 and 51 are shown formed with a single layer of turns on the stepped portions 59-63 and 59'-63' in FIG. 4. In operation, the coil transfer tool 1 is selectively positioned near the outer end 67 of the upper portion 57 of the coil form 56 so as to be within the opening 64 provided between the spaced portions 65 and 66. The transfer tool 1 is thereafter axially inserted into the opening 64 so that the outer coil 43 slides along the adjacent rods 5 and is received within the slots 42 and 42' of the transfer tool 1. In a similar manner, the coil 45 slides along the adjacent bars 5 and is received within the slots 44 and 44' while the coil 47 slides along the adjacent bars 5 and is received within the slots 46 and 46'. With the coils 43, 45 and 47 positioned within the appropriate slots of the coil transfer tool 1, the outer portion 67 of the upper coil form portion 57 engages the surface 4 of the base portion 2 thereby preventing further axial movement of the fixed rods 6 into the opening 64 within the coil form 56. Operating force is thereafter applied to the nobs 27 and 27' to advance the movable tubes 8 further into the opening 64 so that the coil 49 slides along the adjacent bars 5 and is received within the slots 48 and 48' and the coil 51 slides along the adjacent bars 5 and is received within the slots 50 and 50'.

With the five coils 43, 45, 47, 49 and 51 positioned within the retaining slots 42, 44, 46, 48 and 50, respectively, operating force may be applied to the nobs 27 and 27' to retract the movable tubes to a retracted position with the coils 49 and 51 being retained therein. An operator may preferrably place his fingers over the rods 16, 16', 24, 24', 23 and 23' to enclose the slots 48, 48', 50 and 50' to facilitate the retension of the coils of wire therein while the tubes are being moved to their retracted position.

The stepped nature of the coil forming portions 59 through 63 provide five separate coils each having a different size which permits a smaller coil to be nested within a larger coil when retained by the coil transfer tool 1. Such nesting of one coil within another while on the transfer tool 1 is illustrated in FIG. 6 where the coil 49 is nested within the coil 51 when the movable tubes are returned to their retracted position. The movement of the tubes to the retracted position thus allows an operator to retain and transport a plurality of coils or wire in a compact position for further processing in the fabrication of an electric motor without fear of damaging the coils.

The transfer tool 1 may thereafter be completely removed from the coil forming apparatus 56 by the axial removal from the opening 64 of the coil form. An operator may desire to place his fingers over the openings 42, 42', 44, 44' 46, 46' 48, 48', 50, and 50' to retain the coils therein while removing the transfer tool 1 from the coil forming apparatus 56.

Figure 8:
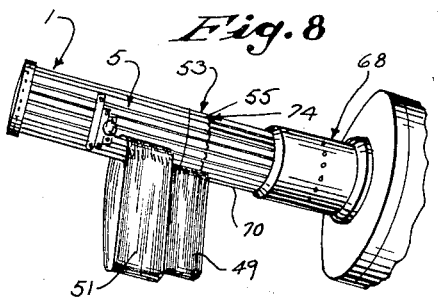
FIG. 8 is a perspective view of the coil transferring apparatus of FIG. 1 with the coil inserting apparatus of FIG. 7 and illustrating the transfer of coils to the inserting apparatus.
Figure 7:
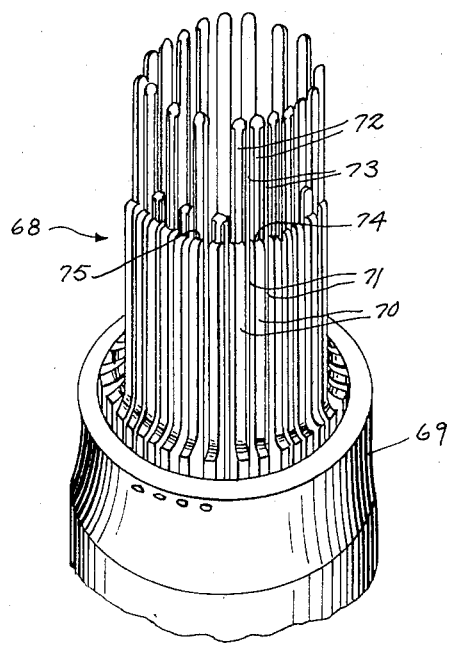
FIG. 7 is a perspective view of a coil inserting apparatus.
Figure 9:
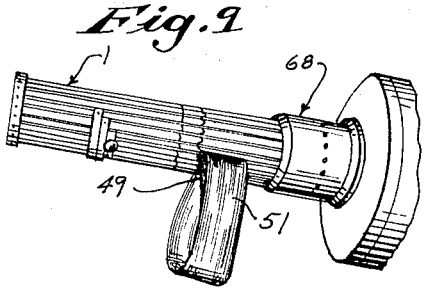
FIG. 9 is a perspective view of the coil transferring apparatus and the coil inserting apparatus of FIG. 8 and illustrating the reception of coils by the inserting apparatus.

The transfer tool 1 with the movable tubes 8 in a retracted position and holding a plurality of coils of wire provides a compact apparatus which may be conveniently transported to a coil inserting apparatus 68 as illustrated in FIGS. 7-9. The coil inserting apparatus 68 is more fully shown and desceibed in the U.S. Pat. No. 3,689,976, issued on Sept. 12, 1972 and assigned to a ccmmon assignee herewith, and includes a supporting base member 69 having a plurality of outwardly extending, circumferentially spaced fingers 70 which provide openings 71 therebetween which are each adapted to receive a coil of wire.

A blade member 72 is associated with each finger 70 and is therefore likewise spaced with respect to adjacent blades 72 to provide openings 73 therebetween which are aligned with the openings 71 provided between the fingers 70. The blades 72 may be fixedly connected to the fingers 70 or mounted for movement by connection to a stripper (not shown) which is housed within the circumferentially spaced fingers 70 and blades 72. The circumferentially spaced blades 72 are mounted inwardly from their corresponding circumferentially spaced fingers 70 and each finger 70 provides a V-shaped opening 74 which is formed to permit the passage of an insulating wedge member which is customarily inserted into the stator to enclose the stator slots following the insertion of the coils by the stripper.

The coil transfer tool 1 is selectively mated with the coil inserting apparatus 68 to transfer the coils into selected slots 71 and 73 as illustrated in FIGS. 8 and 9. The plurality of circumferentially spaced rods 5 of the coil transferring tool 1 are telescoped over the circumferentially spaced blades 72 of the coil inserting apparatus 68 until the top portions 55 of the end caps 53 mounted on the rods 5 engage the V-shaped openings or notches 74 in the coil inserting apparatus 68. The engagement between the tip portions 55 and the notches 74 properly aligns the plurality of coil retaining openings provided by the coil transfer tool 1 with the coil receiving openings 71 and 73 provided by the coil inserting apparatus 68 to permit the easy and convenient transfer of coils from the coil transfer tool 1 to the coil inserting apparatus 68. The engagement of the tip portions 55 with the openings or notches 74 provides a highly desirable mask or covering to hide the edges 75 which surround each opening 74. If left exposed, such edges 75 might provide sharp surfaces which would tend to scrape and damage the wire insulation as the coils are being transferred from the transferring tool 1 to the coil inserting apparatus 68 thereby rendering the coil inoperative. Frequently, such a damaged coil might not be detected until the motor is completely fabricated and tested thereby necessitating the discarding or rewinding of the entire motor.

With the coil transfer tool 1 mated with the coil inserting apparatus 68 as illustrated in FIGS. 8 and 9, the coils are conveniently moved from the coil retaining openings of the coil transfer tool 1 into the appropriate openings 71 and 73 provided by the coil inserting apparatus 68.

The subject invention therefor provides a highly desirable apparatus for processing coils of wire to be used in a dynamoelectric machine and features a highly novel and unique coil transfer tool 1 which permits a large number of coils of wire to be received and retained in a compact carrying position. Although the invention is not so limited, the transfer tool may advantageously be utilized to handle a large number of coils which are formed of only a single layer of turns to ensure that each layer will be maintained in the proper assembled form so as not to permit tangling of the wire turns. The single layer coils may therefore be easily removed from the coil forming apparatus 56 and delivered to the coil inserting apparatus 68 in the assembled form as originally wound to facilitate the efficient and economical manufacture of dynamoelectric machines.

Various modes of carrying out the invention are contemplated as being within the scope of the following claims particularly pointing out and distinctly claiming the subject matter which is regarded as the invention.

I claim:

1. An apparatus for processing spaced coils of wire retained on a coil holding means to be used in a dynamoelectric machine, comprising a coil transferring means for removing said coils from said holding means and including a first coil retaining means fixedly connected to a supporting member for receiving a first coil and a second coil retaining means movably connected to said supporting member for movement between retracted and extended positions for receiving a second coil, said supporting member removably positioned adjacent to said coil holding means for mating said first retaining means with said first coil and said second retaining means moved to an extended position for mating with said second coil.

2. The processing apparatus of claim 1, wherein said second coil is larger than said first coil, and said second coil retaining means is selectively movable to said retracted position with said second coil to nest said first coil within said second coil.

3. The processing apparatus of claim 1, wherein said first and second coil retaining means each includes a pair of elongated members spaced to provide an opening for removably retaining a coil of wire.

4. The processing apparatus of claim 1, wherein said first and second coil retaining means share a common elongated member.

5. The processing apparatus of claim 1, wherein said second coil retaining means is selectively movable to a first extended position, and said coil transferring means further includes a third coil retaining means movably connected to said supporting member for movement between a retracted position and a second extended position greater than said first extended position for mating with a third coil.

6. The processing apparatus of claim 5, wherein said first, second and third coil retaining means each includes a pair of elongated members spaced to provide an opening for removably retaining a coil of wire, said first and second retaining means sharing one common elongated member and said second and third retaining means sharing another elongated member.

7. An apparatus for processing spaced coils of wire retained on a coil holding means to be used in a dynamoelectric machine, comprising a coil transferring means for removing said coils from said holding means and including a first coil retaining means movably connected to a supporting member for movement between a first retracted position and a first extended position for receiving a first coil and a second coil retaining means movably connected to said supporting member for movement between a first retracted position and a second extended position greater than said first extended position for receiving a second coil, said supporting member removably positioned adjacent to said coil holding means with said first retaining means moved to said first extended position for mating with said first coil and said second retaining means moved to said second extended position for mating with said second coil.

8. The processing apparatus of claim 7, wherein said second coil is larger than said first coil, and said first and second coil retaining mean selectively movable to said first and second retracted positions with said first and second coils, respectively, to nest said first coil within said second coil.

9. An apparatus for processing a plurality of axially spaced coils of wire retained on a coil holding means to be used in a dynamoelectric machine, comprising a coil transferring means removably positioned adjacent to said coil holding means and having a plurality of spaced members providing a plurality of spaced openings therebetween for supporting said plurality of coils and including an extension means for permitting a selected member to be longitudinally movably between a retracted position and an extended position to be disposed within one of said axially spaced coils of wire for removal thereof from said coil holding means to said coil transferring means.

10. The processing apparatus of claim 9, and including a support member connected to maintain said members in a spaced relationship, said extension means including a rod-shaped member fixedly connected to said support member, and said selected member including an elongated tube mounted to telescope over said rod-shaped member.

11. The processing apparatus of claim 9, wherein said transferring means includes a supporting means for retaining said members in a spaced relationship with one of said members fixedly extending from said support means for selective positioning within a first coil and said selected member selectively movable with respect to said first member for positioning within a second coil axially spaced from said first coil for removal of said first and second coils from said holding means to said transferring means.

12. The processing apparatus of claim 11, wherein the extended position of said selected member constitutes a first extended position, and including a second selected member movable to a second extended position greater than said first extended position for positioning within a third coil axially spaced from said first and second coils for removal of said first, second and third coils from said holding means to said transferring means.

13. The processing apparatus of claim 11, wherein said second coil is larger than said first coil, and said selected member selectively movable to said retracted position with said second coil so that said first coil becomes nested within said second coil.

14. The processing apparatus of claim 9, and including a member connected to support said spaced members with a first and a second spaced members fixedly connected to said support member, said extension means including a guide member connected to said first and second members and providing means for guiding said selected member during longitudinal movement.

15. The processing apparatus of claim 14, wherein said extension means provides a stop means cooperating with said guide member and said selected member for defining said extended position.

16. The processing apparatus of claim 15, and including a second stop means cooperating with said guide member and said selected member for defining said retracted position.

17. The processing apparatus of claim 9 wherein said transferring means includes a supporting means for retaining said members in a spaced relationship and including a first selected member selectively movable away from said supporting means to a first extended position to be disposed within a first coil and a second selected member selectively movable away from said support means to a second extended position greater than said first extended position to be disposed within a second coil axially disposed from said first coil for removal of said first and second coils from said holding means to said transfer means.

18. The processing apparatus of claim 17, and including a third selected member selectively movable away from said supporting means to the first extended position, said extension means including a guide member connected to said first and third selected members to provide for the simultaneous movement of both and providing means for guiding said second selected member during longitudinal movement between the retracted position and the second extended position.

19. The processing apparatus of claim 18, wherein said extension means further includes a stop means cooperating with said second selected member and said guide member for defining said second extended position.

20. The processing apparatus of claim 9, and including a member connected to support said spaced members in a circumferential relationship with a first fixedly connected member mounted directly adjacent to a second fixedly connected member for providing a first opening therebetween for receiving a first coil of wire, a third fixedly connected member mounted directly adjacent to said second member for providing a second opening therebetween for receiving a second coil of wire, a fourth movably connected member mounted directly adjacent to said third member for providing a third opening therebetween for receiving a third coil of wire, a fifth movably connected member mounted directly adjacent to said fourth member for providing a fourth opening therebetween for receiving a fourth coil of wire, and a sixth movably connected member mounted directly adjacent to said fifth member for providing a fifth opening therebetween for receiving a fifth coil of wire.

21. An apparatus for transferring a plurality of coils of wire to an inserting means having a plurality of spaced inserting members providing a plurality of openings therebetween for receiving said plurality of coils and inserting such coils into a dynamo-electric machine stator with certain inserting members including a finger extending outwardly from a supporting member and having an opening for permitting the passage of an insulating member, comprising a coil transferring means having a plurality of spaced transferring members providing a plurality of spaced openings therebetween for supporting said plurality of coils with certain of said transferring members providing means for masking at least a portion of certain of said finger openings to permit said plurality of coils to be transferred from said transferring means to said inserting means without being damaged by said fingers.

22. The processing apparatus of claim 21, wherein said plurality of transferring members are circumferentially spaced with respect to each other and are selectively co-axially spaced with respect to the circumferentially spaced inserting members, said masking means engaging each of said finger openings so that the openings within said inserting means are aligned with the openings within said transferring means.

23. The processing apparatus of claim 22, wherein said spaced inserting members each includes an inserting blade extending outwardly from said finger openings away from said supporting member, said circumferentially spaced transferring members selectively co-axially located about said inserting blades with said masking means engaging said finger openings.

* * * * *